(12) United States Patent
Perry et al.

(10) Patent No.: US 10,815,011 B2
(45) Date of Patent: Oct. 27, 2020

(54) RESTRAINT SYSTEM FOR DEPLOYMENT OF A FEATURE ON A SATELLITE

(71) Applicant: Planet Labs Inc., San Francisco, CA (US)

(72) Inventors: Jedd Perry, San Francisco, CA (US); Narinder Kumar, San Francisco, CA (US); Kelly Hering, San Francisco, CA (US); Kevin Meissner, San Francisco, CA (US); Bayard Gardineer, San Francisco, CA (US); Benjamin Howard, San Francisco, CA (US)

(73) Assignee: Planet Labs, Inc., San Francisco, CA (US)

( * ) Notice: Subject to any disclaimer, the term of this patent is extended or adjusted under 35 U.S.C. 154(b) by 337 days.

(21) Appl. No.: 15/863,376

(22) Filed: Jan. 5, 2018

(65) Prior Publication Data

US 2019/0210743 A1 Jul. 11, 2019

(51) Int. Cl.
*B64G 1/22* (2006.01)
*B64G 1/64* (2006.01)
(Continued)

(52) U.S. Cl.
CPC ............. *B64G 1/222* (2013.01); *B32B 1/00* (2013.01); *B64G 1/641* (2013.01); *B64G 1/645* (2013.01);
(Continued)

(58) Field of Classification Search
CPC ........ B64G 1/222; B64G 1/645; B64G 1/641; B64G 2001/643; B32B 1/00; H01C 7/10; H01C 7/13
See application file for complete search history.

(56) References Cited

U.S. PATENT DOCUMENTS 6,119,984 A * 9/2000 Devine .................. B64G 1/222
244/172.9
7,422,403 B1 * 9/2008 Johnson ................ B23P 11/025
411/392

(Continued)

OTHER PUBLICATIONS

International Search Report and Written Opinion for International Appln. No. PCT/US2019/012421 dated Apr. 5, 2019, 15 pages.

(Continued)

*Primary Examiner* — Valentina Xavier
(74) *Attorney, Agent, or Firm* — Fountainhead Law Group P.C.

(57) ABSTRACT

In one embodiment, an apparatus is attached to a feature to be deployed on a satellite. The apparatus includes a first material having an impedance, a second material coupled to the first material configured to provide a current or voltage to the first material causing the first material to generate heat based on the impedance after a launch process of a launch vehicle carrying the satellite has completed, and a third material configured to change state at a transition temperature. A release mechanism is coupled to the third material and holds the feature in an undeployed position on the satellite. The heat generated by the second material causes the third material to change state when the transition temperature range is reached and the release mechanism is released from the third material when the third material is in the second state to deploy the feature.

20 Claims, 7 Drawing Sheets

(51) Int. Cl.
 B32B 1/00 (2006.01)
 H01C 7/10 (2006.01)
 H01C 7/13 (2006.01)
(52) U.S. Cl.
 CPC ............... *H01C 7/10* (2013.01); *H01C 7/13* (2013.01); *B64G 2001/643* (2013.01)

(56) References Cited

U.S. PATENT DOCUMENTS

| | | |
|---|---|---|
| 2004/0231933 A1 | 11/2004 | Buchele et al. |
| 2012/0104177 A1* | 5/2012 | Choi ..................... B64G 1/222 244/173.3 |
| 2017/0113817 A1* | 4/2017 | Koehler .................. F03G 7/065 |

OTHER PUBLICATIONS

International Preliminary Report on Patentability and Written Opinion for PCT Application No. PCT/US2019/012421, dated Jul. 7, 2020, 8 pages.

* cited by examiner

RESTRAINT SYSTEM FOR DEPLOYMENT OF A FEATURE ON A SATELLITE

BACKGROUND

Constellations of small satellites in a nano-satellite category are used for remote sensing of the earth. Nano-satellites may be referred to as cube satellites and be composed of one or more 10 cm (cubic-based units). The volume and mass requirement specifications are much more constrained with cube satellites compared to traditional satellites. However, the amount of sensors and payload required to complete remote sensing missions is increasing, which requires tighter integration and more efficient use of volume and mass in the satellite.

One example where volume use is limited is during the launch process. A launch vehicle, such as a rocket, may stow multiple satellites and there is limited space to store all of the satellites in a cargo area. One method that satellite designers use to maximize the limited volume available is to implement deployable features, such as solar panels, sensor packages, antennas, star cameras, and sunshields. A restraint or release mechanism is used to pivot or extend a deployable feature into position using electromechanical moving parts. However, the feature needs to be held in place during stowage through launch before being deployed. Typically, the features need to be successfully deployed after launch with a 100 percent success rate or the cube satellite will not be operational. However, electromechanical systems are failure-prone because to the high shock, vibration, radiation, and high temperature gradients that occur during the launch.

DETAILED DESCRIPTION

Figure 1A:
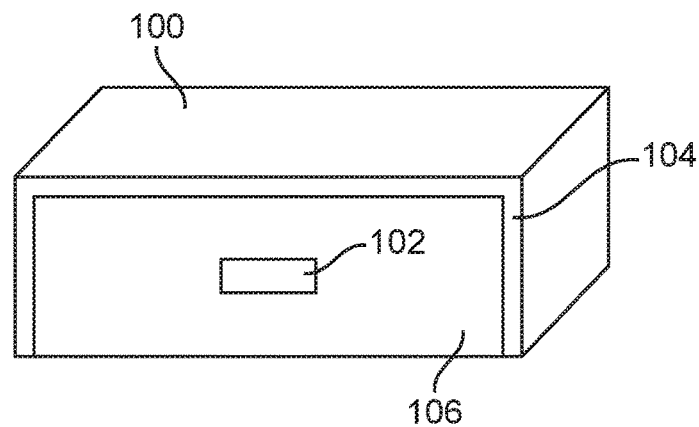
FIG. 1A depicts an example of a satellite including a restraint system according to some embodiments.

Described herein are techniques for a satellite deployment system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments provide a restraint system that is included on a satellite and deploys a feature after launch of the satellite from a launch vehicle, such as a rocket. During a launch sequence, the satellites may experience extreme conditions with respect to shock, vibration, radiation, and large temperature gradients. The restraint system may include solid state materials that withstand these conditions and successfully deploy the features without electromechanical parts that include moving parts powered by electricity. Further, the restraint system may scale easily to deploy small to large features. As discussed above, the feature may include solar panels, sensor packages, antennas, star cameras, and sun shields, or any other deployable feature. The restraint system may restrain or hold the feature to a portion of the satellite while the feature is under compression or tension by a release mechanism. For example, the release mechanism prevents a spring like mechanism that is applying a positive deployment force to the feature in a direction from deploying the feature.

The restraint system includes a phase-change restraint material that changes state at a transition temperature. For example, when the material is below the temperature, the structure of the material is a solid state, such as a "glassy" state that reliably holds, binds, and restrains the deployment of the feature. However, when the material goes above the temperature, the material experiences a phase change to an amorphous material and the restraint system is released from being attached to a release mechanism to deploy the feature.

To control the temperature, a phase change source is used to provide heat to the phase change restraint material, such as in a precise location at a precise time. In some examples, the phase change source includes a selective impedance material that has a controllable resistance, such as a resistive ink or doped region of a dielectric. The impedance of the phase change source allows a controlled amount of power to be dropped across the selective impedance material, which the selective impedance material converts to heat. If enough power is dropped across the selective impedance material, the phase change restraint material is heated and can cause the temperature of the phase change restraint material to rise above the transition temperature causing the phase change.

When the phase change occurs, the phase change restraint material can no longer hold the positive deployment force of the release mechanism, which causes the restraint system to be released from the release mechanism and then the feature is deployed. For example, an attachment to the satellite may be inserted into the phase change material. When the phase change material is solid, the attachment and feature are held in place, such as against a plane or sidewall of the satellite. When the phase change occurs, the attachment is released from the phase change material and the structure is deployed, such as the feature may rotate outwardly on a hinge.

The use of the phase change material allows a controlled deployment due to the transition temperature. If the transition temperature is selected above any temperature gradient that may occur during the launch of the launch vehicle and before the satellite is launched into the atmosphere, the deployment can be controlled by the power provided to the selective impedance material. This may eliminate any premature deployment during the launch process due to temperature gradients. Also, the phase change material may be resistant to vibration and shock during the launch due to the solid state of the phase change material and does not deploy due to any of the shock or vibration experienced. The restraint system may not use any moveable parts powered by electricity nor any materials that are explosive. This provides an ideal restraint mechanism for deployment of a feature on a satellite.

Satellite Overview

FIG. 1A depicts an example of a satellite 100 including a restraint system 102 according to some embodiments. In some examples, satellite 100 may be considered a cube or nano-satellite. The dimensions of the cube may include a 3-U housing where the 3-U housing is 10 cm (width)×10 cm (depth)×30 cm (length). Other satellite dimensions may also be appreciated. Sensors, payload, optics, and other components needed for remote sensing are included inside of satellite 100.

Satellite 100 may include a first sidewall 104 in which a feature 106 is restrained. For example, feature 106 may include a solar panel, but it will be understood that other features may be deployed as described above and be attached to different portions of satellite 100 or be in different positions. The position depicted in FIG. 1A is an undeployed position for feature 106.

Figure 1B:
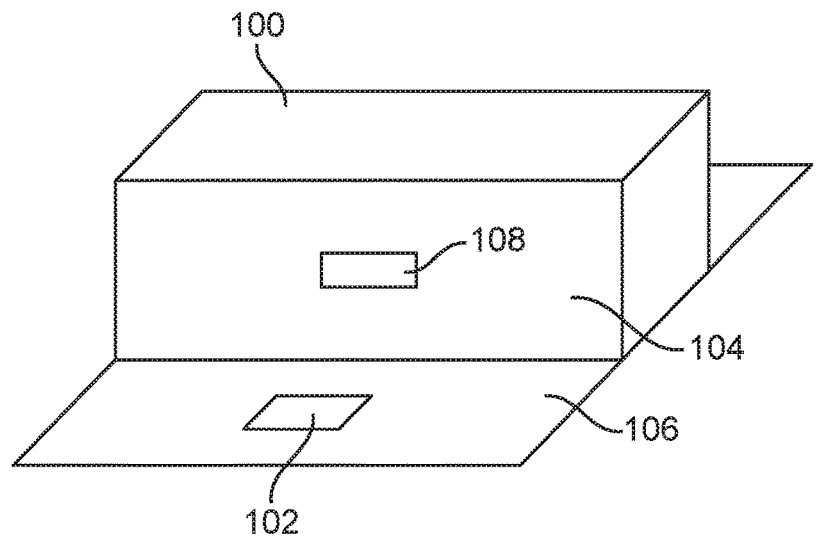
FIG. 1B depicts an example of a deployed position for the feature according to some embodiments.

FIG. 1B depicts an example of a deployed position for feature 106 according to some embodiments. In this example, feature 106 has been released from sidewall 104 of the satellite body. Once released, feature 106 moves from the restrained position to the deployed position, such as via a hinge that rotates feature 106. The movement in this example opens feature 106, but other movements may be appreciated. Also, the hinge and movement do not require any electrical power to move feature 106. Restraint system 102 is still attached to feature 106 after deployment. However, in other examples, restraint system 102 may still be attached to the satellite body.

A release mechanism 108 includes components that perform the deployment of feature 106. As will be described in more detail below, release mechanism 108 may exert a positive force on feature 106 in the direction of deployment, such as outward from first sidewall 104.

The positive force may be exerted without requiring any electrical power. For example, a spring-like mechanism may force feature 106 to deploy outward. Although a spring is discussed, other release mechanisms may be appreciated.

Release mechanism 108 may be attached to restraint system 102, such as via an attachment that is attached to restraint system 102 (e.g., inserted into or attached to the surface). In some embodiments, the attachment may include an elongated member, which may include a screw, rod, nail, or other structures. The attachment may include a long narrow portion and a head. When the phase change occurs in the phase change restraint material, the attachment is released from the phase change restraint material. Then, restraint system 102 can no longer hold the positive force of release mechanism 108 and feature 106 is then deployed.

Figure 2:
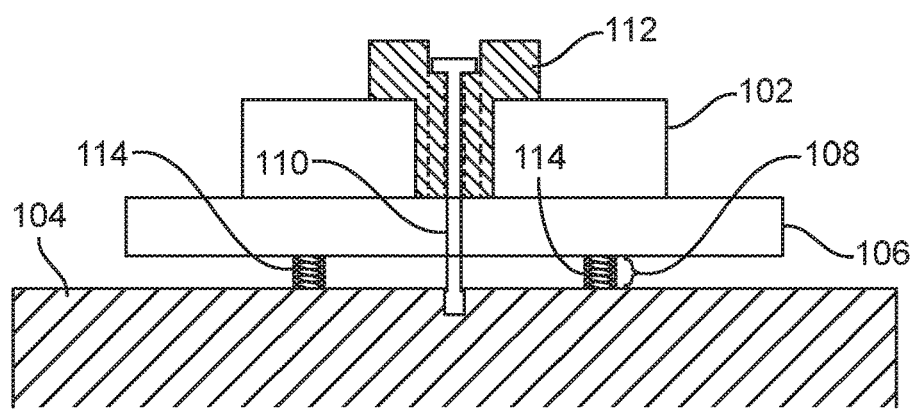
FIG. 2 depicts another view of satellite according to some embodiments.

FIG. 2 depicts another view of satellite 100 according to some embodiments. Sidewall 104 is attached to feature 106 and restraint system 102 is attached to release mechanism 108. For example, release mechanism 108 includes an attachment 110 that is attached to sidewall 104 and may pass through an aperture in feature 106 and be embedded into a phase change restraint material 112 of restraint system 102.

Phase change restraint material 112 is a material that includes a transition temperature (T), where when the transition temperature is met (e.g., goes above), phase change restraint material 112 changes state. Phase change restraint material 112 may be a material in which the phase change is not naturally present in the environments restraint system 102 will experience during the launch process of the launch vehicle. Also, phase change restraint material 112 can be controlled to precisely change state at a certain time and temperature. With both of these conditions in place, restraint system 102 is naturally in a stable state with no outside influence causing the state change of phase change restraint material 112 therefore providing a system in which the interaction of the phase change is not exposed to outside system variables that affect the timing of the phase change, which eliminates false triggers for deployment.

As discussed above, phase change restraint material 112 may transition from a solid state (e.g., a glassy state) to an amorphous state (e.g., a rubber or flowing state), which can be a softer state than the solid state. In some embodiments, phase change restraint material 112 may have a transition temperature of about 147° C. (297° F.) so phase change restraint material 112 softens gradually above this point and starts to flow above about 155° C. During a launch process, the temperature gradient may not exceed about 147° C. In some embodiments, phase change restraint material 112 may be a polycarbonate material, but other materials may be used. While in its solid state, phase change restraint material 112 can hold attachment 110 against the force exerted by release mechanism 108. In this state, attachment 110 holds panel 106 in place with respect to sidewall 104. For example, a head portion holds attachment 110 in place. However, when in the amorphous state, the softened material cannot hold feature 106 in place against the force of release mechanism 108.

Release mechanism 108 includes one or more deployment mechanisms 114 that exert force on a panel 106 in a direction, such as away from sidewall 104. For example, deployment mechanisms 114 may include spring components that force panel 106 outward with respect to sidewall 104 although components other than springs maybe used. It is noted that in some embodiments, deployment mechanisms 114 do not include any electromechanical elements. That is, electrical power does not power deployment mechanisms 114.

When the phase change to phase change restraint material 112 occurs, attachment 110 is released from phase change restraint material 112. That is, when in the amorphous state, phase change restraint material 112 cannot hold attachment 110 when the force of deployment mechanism 114 against panel 106 is applied. In this case, panel 106 moves outward due to attachment 110 when no longer being held by phase change restraint material 112. In this case, panel 106 is deployed as depicted in FIG. 1B. Also, when feature 106 is deployed, the source of the temperature rise becomes disconnected and the temperature being applied to phase change restraint material 112 falls below the transition temperature. Then, phase change restraint material 112 may change state again, and becomes solid again. Because phase change restraint material 112 becomes solid, it may not affect the operation of feature 106.

Restraint System

Figure 3:
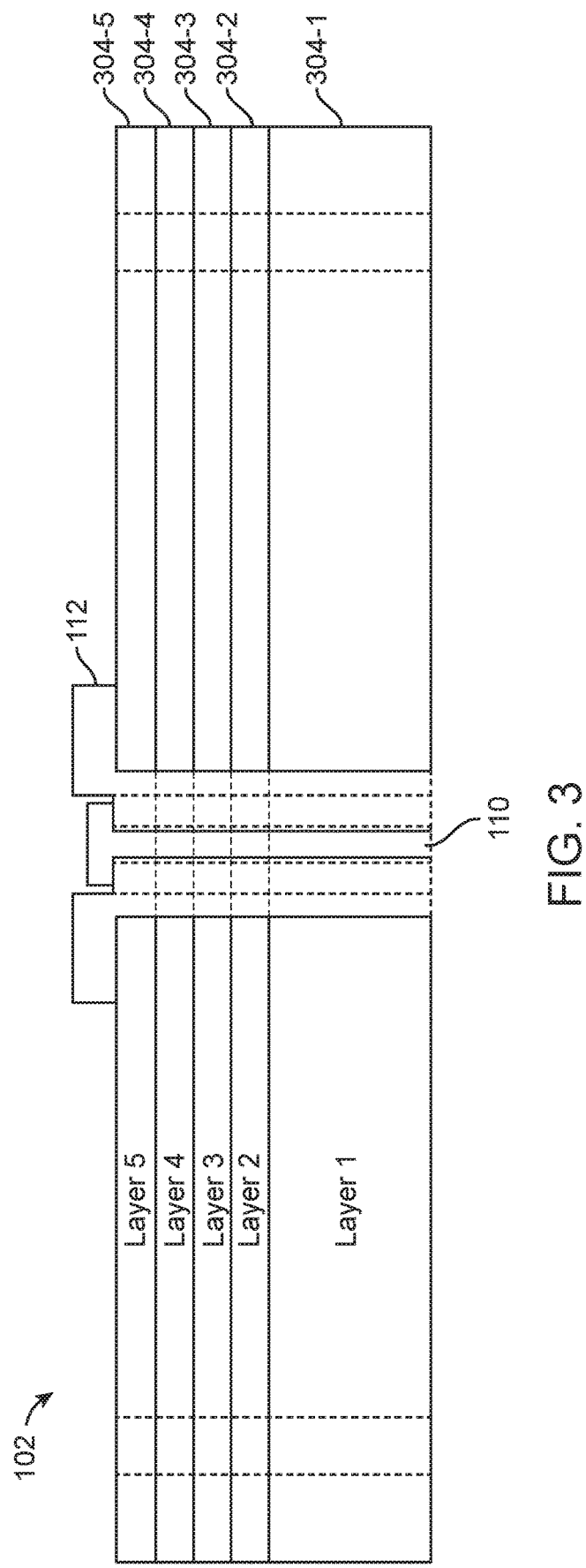
FIG. 3 depicts an example of layers of the restraint system according to some embodiments.

FIG. 3 depicts an example of layers of restraint system 102 according to some embodiments. In a cross-section of restraint system 102, restraint system 102 may include multiple layers that are used to apply the temperature change to cause the phase change in phase change restraint material 112. Although five layers are described, it will be understood that a different number of layers may be used.

A Table I depicts the layer numbers, a layer description, and a purpose of the layer.

TABLE I

| Layer # | Layer Description | Purpose |
| --- | --- | --- |
| 1 | Dielectric | Thermal and electrical insulator |
| 2A/2B | Conductive material/selective impedance material | Apply current/voltage to selective impedance material to generate heat |
| 3 | Electrical insulator | Insulation |
| 4 | Conductive layer | Electrical and thermal conduction |
| 5 | Plating | Plating of conductive material for stability |

Layer #1 at 304-1 may be proximate to a side of feature 106. For example, layer #1 may be attached to feature 106 physically. In some embodiments, layer #1 may be a dielectric material that provides thermal and electrical insulation. Also, layer #1 may be a firm structure that provides support for the other layers.

Layer #2 at 304-2 may include two sub-layers #2A and #2B. Layer #2A may include a conductive material, and layer #2B may include a selective impedance material. The conductive material may be placed on layer #1 and connects a power source to the selective impedance material. In some examples, the conductive material may be first placed on layer #1 and then, a mask may be used to etch away portions of the conductive material. However, the etching step may not be performed. For example, the conductive material may be placed on layer #1 in a pattern that is required without any need for etching. After etching, the targeted impedance material may then be deposited in the etched away areas. For example, the system deposits a resistive ink as the targeted impedance material in certain areas that are close to the conductive material and also to phase change restraint material 112. In some embodiments, the conductive material may be copper based and the selective impedance material is resistive ink. The resistive ink may be resistant to shock, vibration, and temperature gradients that occur during the launch sequence of the satellite. Also, the resistive ink may have a targeted impedance that allows the satellite to apply a current and voltage to generate a desired amount of heat. In some embodiments, layer #2 may be a polyimide film with an electrically conductive material. In other embodiments, layer #2 may include a silver conductor ink base.

Layer #3 at 304-3 may be an electrical insulator. Layer #4 at 304-4 may be a conductive layer that includes electrically and thermally conductive material. Layer #5 at 304-5 is a plating layer that provides a plating of conductive material. Layers #4 and #5 provide a conductive material and plating for stability in a launch and space environment. Layers #4 and #5 also help with the transfer of heat to an isolated position to cause a phase change to occur in phase change restraint material 112. Although the above layers are described, it will be understood that the layers may be re-arranged in different arrangements and also layers may be removed. For example, layers #3-#5 may be removed. Also, layer #1 may also be removed in some embodiments.

Figure 4:
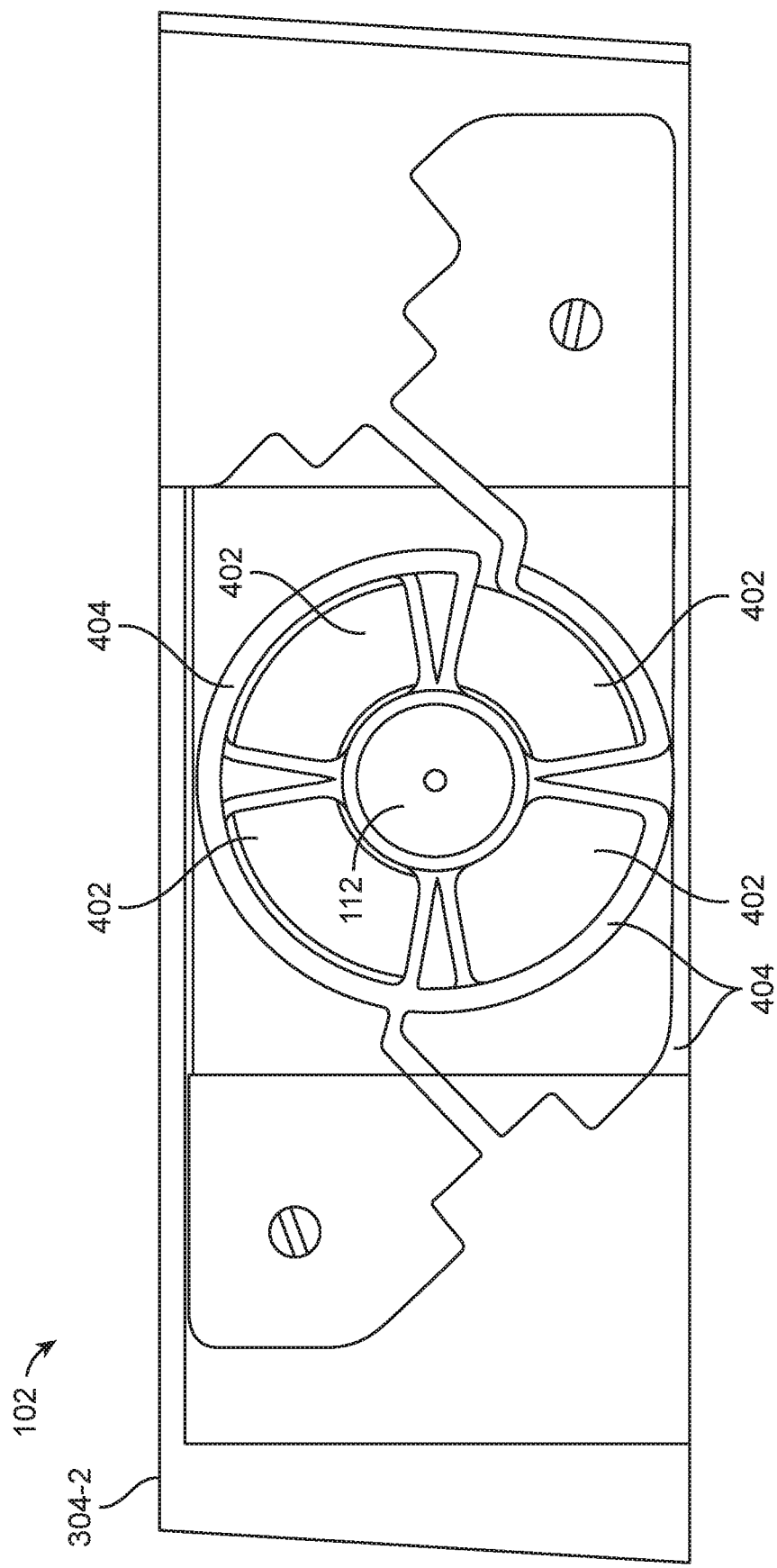
FIG. 4 depicts an example of layers #2A and #2B of layer #2 according to some embodiments.

Some of the layers will now be described in more detail. FIG. 4 depicts an example of layers #2A and #2B of layer #2 according to some embodiments. Layer #2 at 304-2 may include a selective impedance material 402 and a conductive material 404. In some embodiments, conductive material 404 may be coupled to be adjacent to selective impedance material 402. For example, conductive material 404 may substantially contact selective impedance material 402.

As shown, selective impedance material 402 may be located in four areas with conductive material 404 substantially surrounding the four areas. There may be some small breaks in conductive material 404, but the breaks may not be necessary. Also, although conductive material 404 may be surrounding the areas, conductive material 404 does not need to surround every side of selective impedance material 402. Further, although four areas of selective impedance material 402 are used, other configurations may be used, such as a continuous ring of selective impedance material 402 around phase change restraint material 112.

Phase change restraint material 112 may be located adjacent to selective impedance material 402. For example, phase change restraint material 112 may contact conductive material 404 and/or selective impedance material 402. However, since heat is being used to cause the phase change, selective impedance material 402 may be positioned close enough to phase change restraint material 112 such that heat emanates from selective impedance material 402 and is focused by layer #4 and #5 towards phase change restraint material 112. Also, as shown, selective impedance material 402 may be positioned around phase change restraint material 112. Additionally, as will be discussed later, layers #4 and #5 may also focus the heat towards phase change restraint material 112. This provides heat uniformly to phase change restraint material 112. The amount of heat needed to generate the phase change may vary based on the positioning of selective impedance material 402 and phase change restraint material 112.

In operation, conductive material 404 may be coupled to an electrical source (not shown) that provides current/voltage (e.g., power). It should be noted that although an electrical source is being used, the power provided is not to power any movement of feature 106. Rather, conductive material 404 provides the current/voltage to selective impedance material 402. The drop of power across the resistance of selective impedance material 402 converts the power to heat. If enough power is dropped across selective impedance material 402, selective impedance material 402 generates enough heat that is focused towards phase change restraint material 112 to raise the temperature of phase change restraint material 112 above its transition temperature. In some embodiments, the design of the layers of restraint system 102 may focus the majority of the heat generated from selective impedance material 402 onto phase change restraint material 112.

In some embodiments, a feedback loop is included that is used to control the heat generated and temperature at phase change restraint material 112. For example, the temperature at phase change restraint material 112 is measured and fed back to the source, which can adjust the current/voltage provided via conductive material 404 to selective impedance material 402. This may adjust the power dropped across selective impedance material 402 and control the heat generated to cause the phase change to occur when desired.

Manufacturing Process

Figure 5:
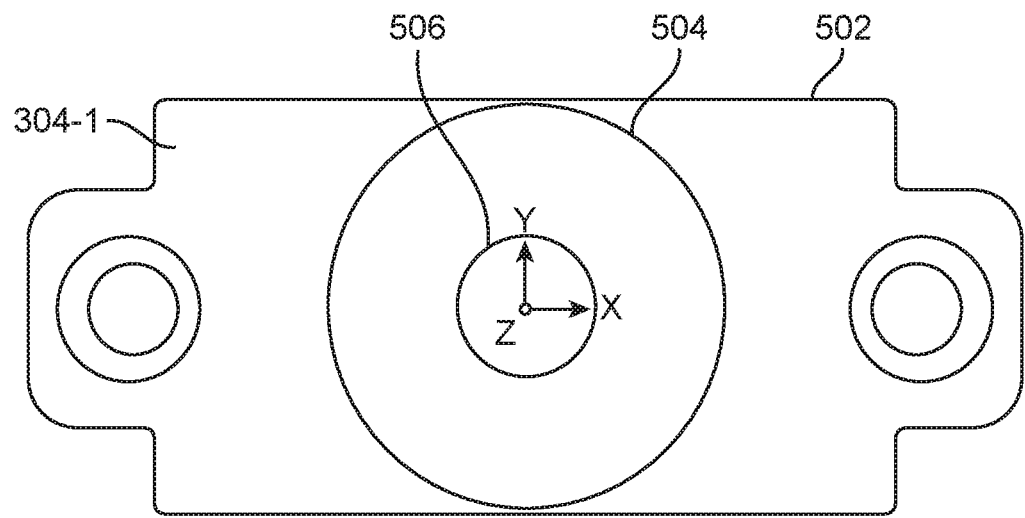
FIG. 5 depicts an example of layer #1 according to some embodiments.

The following will now describe a process of manufacturing restraint system 102 according to some embodiments. FIG. 5 depicts an example of layer #1 at 304-1 according to some embodiments. Layer #1 includes a base structure 502 and a central region 504. Inside of central region 504, an aperture 506 is included for insertion of phase change restraint material 112. Central region 504 includes a thermal conductive disc on the top layer that the heat generated by the resistive ink is centralized around phase change restraint material 112 that is inserted in aperture 506. The disk helps keep the heat from coupling into the unwanted areas and focused around phase change restraint material 112. Base structure 502 may be made of any thermal and electrical non-conductive material that protects the inner portion of the structure where the electrical conductive and resistive ink reside.

Figure 6:
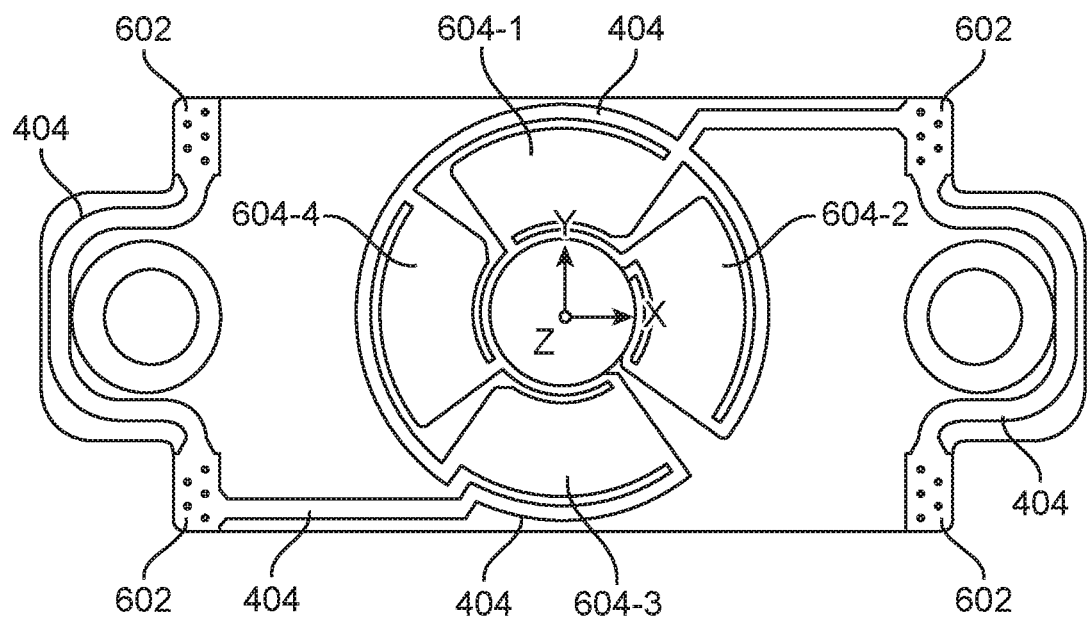
FIG. 6 depicts an example of layer #1 and layer #2A according to some embodiments.

FIG. 6 depicts an example of layer #1 and layer #2A according to some embodiments. A conductive material 404 has been added as layer #2A to layer 304-1. For example, the conductive material is placed on top of layer 304-1 in area 504 leaving aperture 506 without conductive material. Additionally, contact pads 602 are coupled to conductive material 404 to provides current/voltage from a source to current/voltage. The current/voltage may flow from contact pads 602 to conductive material 404 in area 504.

Figure 7:
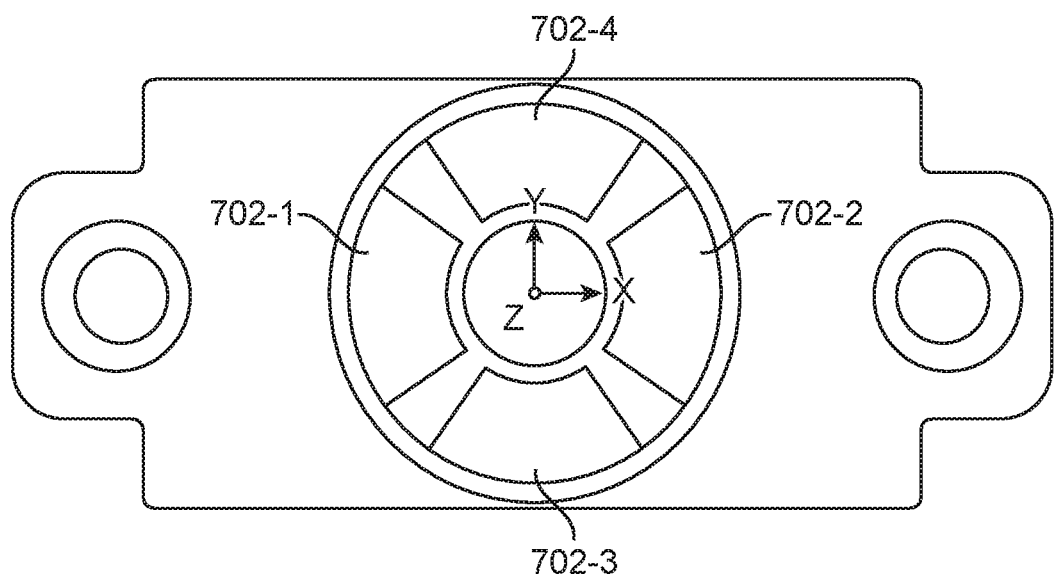
FIG. 7 depicts an example of etching material that is placed on layer #2A according to some embodiments.

Conductive material 404 forms a pattern in area 504. For example, structures 604-1 to 604-4 are created using the conductive material. Part of this conductive material 404 may be etched away in the area such that selective impedance material 402 can be inserted in the etched away portions. For example, FIG. 7 depicts an example of etching material that is placed on layer #2A according to some embodiments. The etching will remove conductive material from the structure 604-1 to 604-4 in conductive material 404 shown in FIG. 6 and then replace the removed areas with selective impedance material 402. For example, areas 702-1 to 702-4 are areas that are not covered by the etching material. When the etching occurs, areas 702-1 to 702-4 are etched away whereas areas outside of these areas 702 are not etched away.

Figure 8:
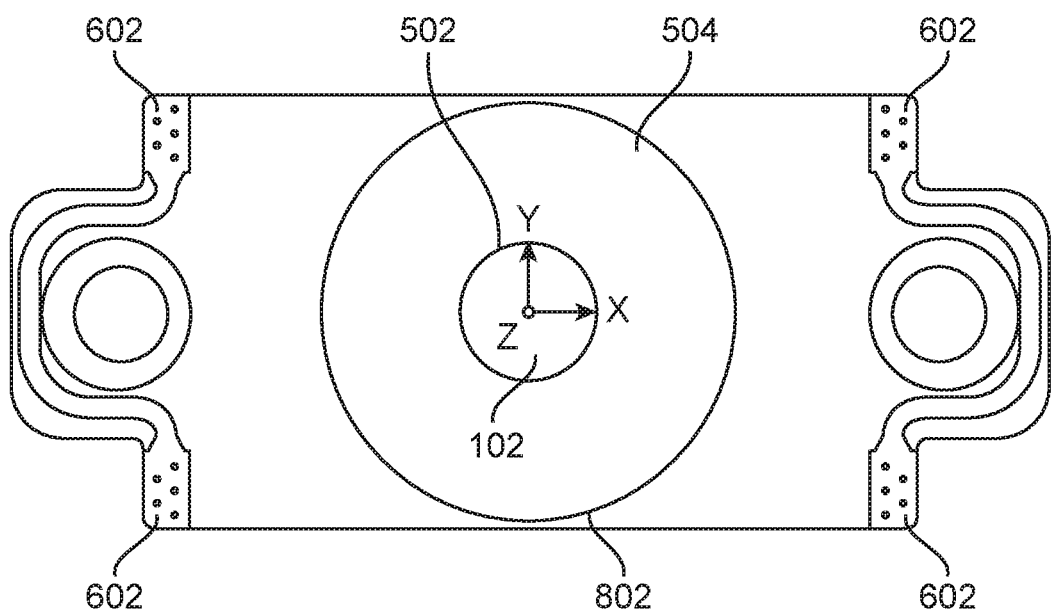
FIG. 8 depicts an example of layers #4 and #5 according to some embodiments.

FIG. 8 depicts an example of layers #4 and #5 according to some embodiments. At 802, a conductive layer and plating has been inserted over area 504. Also, aperture 502 includes selective impedance material 402. Pads 602 are exposed such that they can connect to a source. These pads are still connected to conductive material 404 to conduct electricity to phase change restraint material 112. Layers #4 and #5 cover these layers so layers #1 to #4 cannot be seen in this figure.

Method Flows

Figure 9:
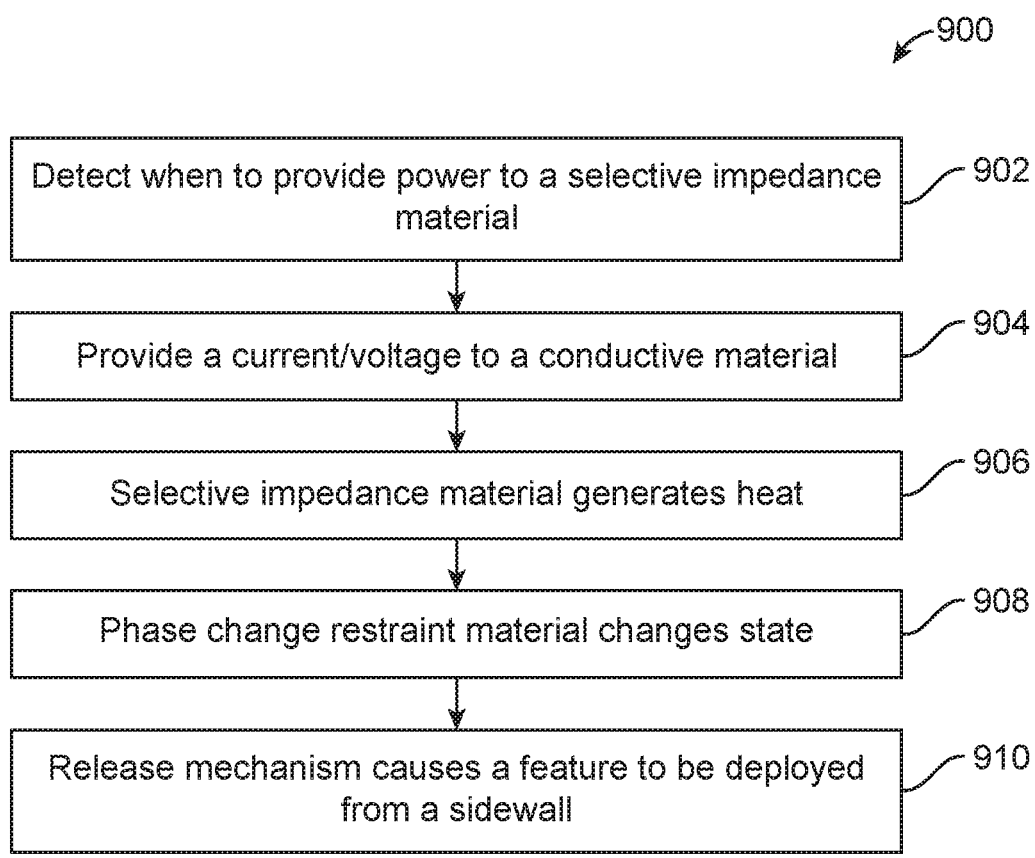
FIG. 9 depicts a simplified flowchart of a method for initiating a phase change according to some embodiments.

FIG. 9 depicts a simplified flowchart 900 of a method for initiating a phase change according to some embodiments. At 902, a source detects when to provide power to selective impedance material 402. In some examples, after a launch occurs, satellite 100 initiates the restraint release process. The restraint release process may start after the launch process of the launch vehicle is completed and satellite 100 is launched from the launch vehicle. When the source detects the initiation of the restraint release process, at 904, the source provides current/voltage to conductive material 404.

At 906, when power (e.g., voltage/current) is applied across selective impedance material 402, selective impedance material 402 generates heat. This heat is coupled to layers #4 and #5, which centralizes the heat around the head of phase change restraint material 112. Once the temperature rises above the transition temperature T of phase change restraint material 112, at 908, phase change restraint material 112 changes state. For example, phase change restraint material 112 changes state from a solid state to an amorphous state, such as the polycarbonate material becomes amorphous and softens into a rubber-like state.

At 910, release mechanism 108 then causes feature 106 to be deployed from sidewall 104. Since restraint system 102 is keeping feature 106 under a compressive load or restraining a spring-force of release mechanism 108, the force from release mechanism 108 overcomes the hold restraint system 102 has on attachment 110 when phase change restraint material 112 turns into its amorphous state. This allows release mechanism 108 to deploy feature 106 as attachment 110 cannot hold restraint system 102 any longer. Once deployed, the source that is coupled to restraint system 102 is disconnected, which means power is not being provided to selective impedance material 402 any longer. This causes the temperature of phase change restraint material 112 to go below the transition temperature T. Thus, at 1012, phase change restraint material 112 changes state back to a solid state. By solidifying, feature 106 can operate regularly.

The above allows release mechanism 108 to release feature 106 without any electromechanical systems that perform mechanical deployment. Further, phase change restraint material 112 can withstand the temperature and shock and vibrations in the launch since the temperature during the launch does not increase above the transition temperature T. Additionally, phase change restraint material 112 is flexible enough that restraint system 102 does not separate from attachment 110 during the launch.

Figure 10:
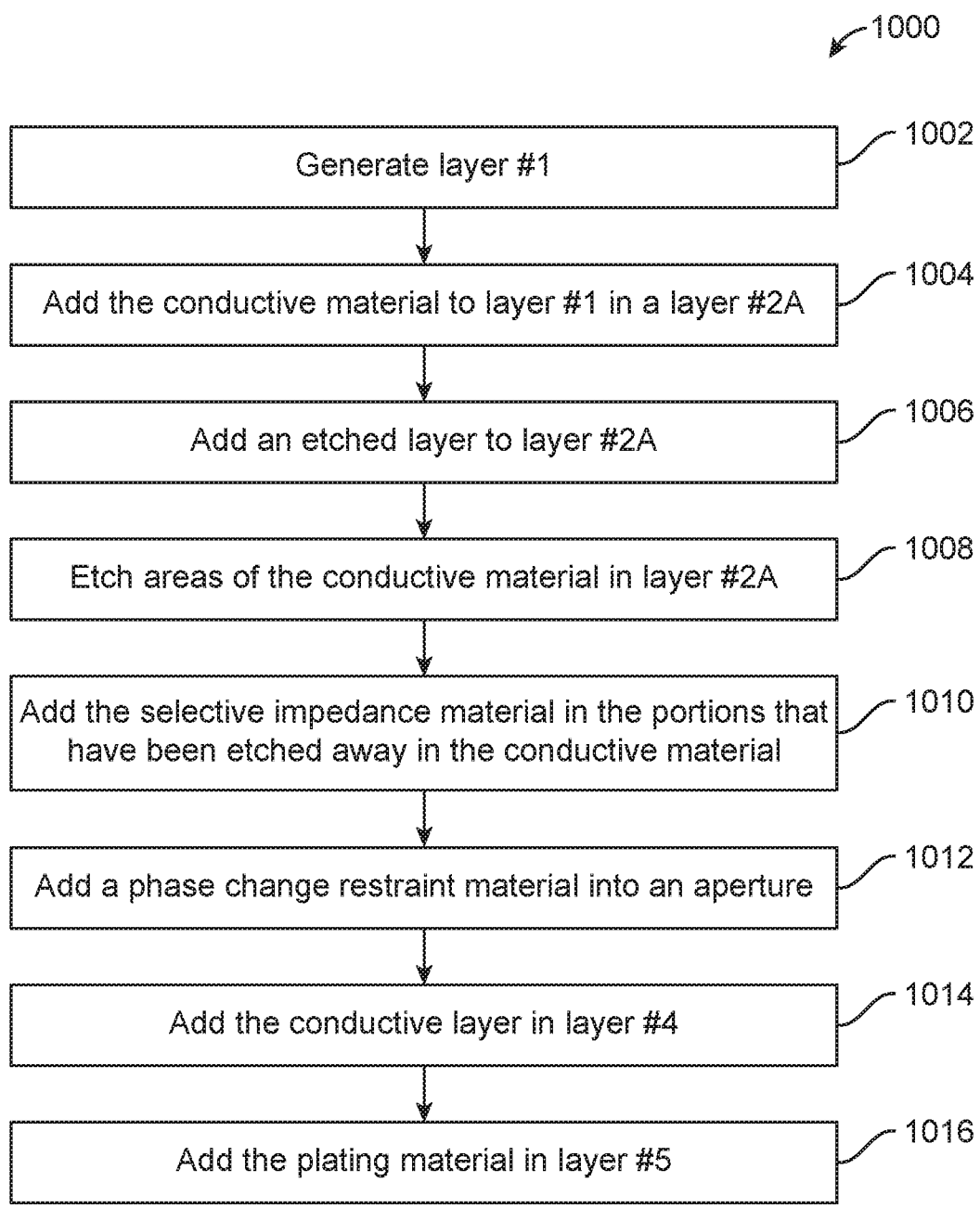
FIG. 10 depicts a simplified flowchart of a method for manufacturing restraint system 102 according to some embodiments.

FIG. 10 depicts a simplified flowchart 1000 of a method for manufacturing restraint system 102 according to some embodiments. At 1002, a machine generates layer #1. Then, at 1004, the machine adds the conductive material to layer #1 in a layer #2A. At 1006, the machine adds an etched layer 702 to layer #2A. Then, at 1008, the machine etches areas of the conductive material in layer #2A.

At 1010, the machine adds the selective impedance material in the portions that have been etched away in the conductive material. At 1012, the machine adds phase change restraint material 112 into aperture 504. At 1014, the machine adds the conductive layer in layer #4. Then, at 1016, the machine adds the plating material in layer #5.

Accordingly, some embodiments provide a restraint system that does not utilize any moving components or explosive devices. Only solid state components that are designed using materials that are minimally impacted by shock or vibration and can handle large temperature gradients are used. The temperature can be controlled via a feedback system to allow satellite 100 to control the precise time to deploy feature 106, which may be critical in the operation of satellite 100.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. An apparatus attached to a feature to be deployed on a satellite, the apparatus comprising:
    a first material having an impedance;
    a second material coupled to the first material configured to provide a current or voltage to the first material causing the first material to generate heat based on the impedance after a launch process of a launch vehicle carrying the satellite has completed;
    a third material configured to change state at a transition temperature; and a second layer located on top of a first layer, the first material, and the second material, wherein the second layer is configured to conduct heat to the third material, wherein:

a release mechanism is coupled to the third material and holds the feature in an undeployed position on the satellite, the heat generated by the first material causes the third material to change state from a first state to a second state when the transition temperature range is reached, and the release mechanism is released from the third material when the third material is in the second state to deploy the feature from the satellite after the launch process has completed.

2. The apparatus of claim 1, wherein the release mechanism comprises:
an attachment that is inserted in the third material, wherein the attachment is released from insertion in the third material when the third material is in the second state.

3. The apparatus of claim 1, wherein the release mechanism comprises:
a deployment mechanism exerting a force in a direction, wherein upon the release mechanism being released from the third material when in the second state, the deployment mechanism causes the feature to deploy.

4. The apparatus of claim 3, wherein when the third material is in the first state, the deployment mechanism does not cause the feature to deploy.

5. The apparatus of claim 3, wherein the deployment mechanism comprises a spring mechanism that exerts the force.

6. The apparatus of claim 1, wherein the first layer comprises a fourth material on which the first material and the second material are placed.

7. The apparatus of claim 1, wherein the third material is placed in an aperture in the first layer.

8. The apparatus of claim 1, wherein:
the second material is located proximate to the first material.

9. The apparatus of claim 1, wherein:
the first material is coupled to the third material.

10. An apparatus attached to a feature to be deployed on a satellite, the apparatus comprising:
a first material having an impedance;
a second material coupled to the first material configured to provide a current or voltage to the first material causing the first material to generate heat based on the impedance after a launch process of a launch vehicle carrying the satellite has completed;
a third material configured to change state at a transition temperature,
a conductive layer to transfer heat to the third material; and
a plating layer;
wherein:
a release mechanism is coupled to the third material and holds the feature in an undeployed position on the satellite,
the heat generated by the first material causes the third material to change state from a first state to a second state when the transition temperature range is reached, and
the release mechanism is released from the third material when the third material is in the second state to deploy the feature from the satellite after the launch process has completed.

11. An apparatus attached to a feature to be deployed on a satellite, the apparatus comprising:
a first layer;
a first material having an impedance, the first material located on top of the first layer;
a second material coupled to the first material configured to provide a current or voltage to the first material causing the first material to generate heat based on the impedance after a launch process of a launch vehicle carrying the satellite has completed;
a third material configured to change state at a transition temperature,
a second layer in between a first layer and a third layer, the second layer configured to provide insulation;
wherein:
a release mechanism is coupled to the third material and holds the feature in an undeployed position on the satellite,
the heat generated by the first material causes the third material to change state from a first state to a second state when the transition temperature range is reached, and
the release mechanism is released from the third material when the third material is in the second state to deploy the feature from the satellite after the launch process has completed.

12. The apparatus of claim 1, wherein:
the first material is located in a plurality of areas surrounding the third material, and
the second material is positioned substantially around the plurality of areas.

13. The apparatus of claim 1, further comprising:
a source to provide the current or voltage to the second material.

14. The apparatus of claim 1, further comprising:
a feedback mechanism configured to determine a temperature of the third material, and
a controller configured to receive the temperature and control the voltage or current to adjust the heat provided to the third material.

15. A method comprising:
coupling a first material having an impedance to a second material;
positioning a third material configured to change state at a transition temperature proximate to the first material;
coupling a release mechanism to the third material to hold the feature in an undeployed position on the satellite,
providing, via the second material, a current or voltage to the first material causing the first material to generate heat based on the impedance after a launch process of a launch vehicle carrying the satellite has completed; and
placing a second layer located on top of a first layer, the first material, and the second material, wherein the second layer is configured to conduct heat to the third material, wherein:
the heat generated by the first material causes the third material to change state from a first state to a second state when the transition temperature range is reached, and the release mechanism is released from the third material when the third material is in the second state to deploy the feature from the satellite after the launch process has completed.

16. The method of claim 15, further comprising:
inserting an attachment that in the third material, wherein the attachment is released from insertion in the third material when the third material is in the second state.

17. The method of claim 15, further comprising:
positioning a deployment mechanism on the satellite to exert a force in a direction, wherein upon the release mechanism being released from the third material when in the second state, the deployment mechanism causes the feature to deploy.

18. The method of claim 15, wherein the deployment mechanism comprises a spring mechanism that exerts the force.

19. A system comprising:
a satellite including a deployable feature;
a restraint system comprising:
a first material having an impedance;
a second material coupled to the first material configured to provide a current or voltage to the first material causing the first material to generate heat based on the impedance after a launch process of a launch vehicle carrying the satellite has completed;
a third material configured to change state at a transition temperature;
a second layer located on top of a first layer, the first material, and the second material, wherein the second layer is configured to conduct heat to the third material; and
a release mechanism coupled to the third material of the restraint system for holding the feature in an undeployed position on the satellite, wherein
the heat generated by the first material causes the third material to change state from a first state to a second state when the transition temperature range is reached, and
the release mechanism is released from the third material when the third material is in the second state to deploy the feature from the satellite after the launch process has completed.

20. The system of claim 19, wherein the release mechanism comprises:
an attachment that is inserted in the third material, wherein the attachment is released from insertion in the third material when the third material is in the second state.

* * * * *